US012038169B2

(12) United States Patent
Boonekamp

(10) Patent No.: US 12,038,169 B2
(45) Date of Patent: Jul. 16, 2024

(54) LIGHT EMITTING DEVICE FOR CREATING DYNAMIC NATURAL LIGHTING EFFECTS

(71) Applicant: SIGNIFY HOLDING B.V., Eindhoven (NL)

(72) Inventor: Erik Paul Boonekamp, Bunnik (NL)

(73) Assignee: SIGNIFY HOLDING, B.V., Eindhoven (NL)

(*) Notice: Subject to any disclaimer, the term of this patent is extended or adjusted under 35 U.S.C. 154(b) by 0 days.

(21) Appl. No.: 18/284,217

(22) PCT Filed: Mar. 28, 2022

(86) PCT No.: PCT/EP2022/058143
§ 371 (c)(1),
(2) Date: Sep. 26, 2023

(87) PCT Pub. No.: WO2022/207562
PCT Pub. Date: Oct. 6, 2022

(65) Prior Publication Data

US 2024/0167662 A1 May 23, 2024

(30) Foreign Application Priority Data

Apr. 1, 2021 (EP) .................................... 21166731

(51) Int. Cl.
*F21V 5/00* (2018.01)
*F21Y 113/13* (2016.01)
*F21Y 115/10* (2016.01)

(52) U.S. Cl.
CPC .......... *F21V 5/007* (2013.01); *F21Y 2113/13* (2016.08); *F21Y 2115/10* (2016.08)

(58) Field of Classification Search
CPC ........................................................ F21V 5/007
See application file for complete search history.

(56) References Cited

U.S. PATENT DOCUMENTS 7,458,700 B2 * 12/2008 Gordin ...................... F21S 2/00 362/431
8,820,972 B2 * 9/2014 Mollnow ............. F21V 29/717 362/228
(Continued)

FOREIGN PATENT DOCUMENTS

EP 2881651 A1 6/2015
WO 2017144303 A1 8/2017

*Primary Examiner* — Bryon T Gyllstrom

(57) ABSTRACT

A light emitting device comprising at least one cluster (11) of light sources and lenses, the at least one cluster (11) comprising a first light source (21) and a second light source (22), a first lens (31) associated with the first light source (21), where the first light source (21) and the first lens (31) and the second light source (22) and the second lens (32), respectively, are arranged in a predefined distance D from the plane P, the predefined distance D being measured in a direction extending perpendicular to the plane P, where the first light source (21) and the first lens (31) are arranged on a first axis (41), and the second light source (22) and the second lens (32) are arranged on a second axis (42), where the first light source (21) and the first lens (31) and the second light source (22) and the second lens (32), respectively, are further arranged and on a straight line extending in parallel with the plane P and perpendicular to the direction in which the distance D is measured.

15 Claims, 9 Drawing Sheets

(56) References Cited

U.S. PATENT DOCUMENTS

| | | | | |
|---|---|---|---|---|
| 9,631,795 | B2 * | 4/2017 | Gordin | F21V 29/73 |
| 9,851,069 | B2 * | 12/2017 | Michiels | G02B 19/0066 |
| 10,201,056 | B1 * | 2/2019 | Gordin | H05B 45/20 |
| 2003/0202241 | A1 * | 10/2003 | Blumel | F21V 5/007<br>359/365 |
| 2006/0245189 | A1 * | 11/2006 | Gordin | F21S 8/085<br>362/234 |
| 2010/0061090 | A1 * | 3/2010 | Bergman | F21V 5/007<br>362/231 |
| 2014/0226337 | A1 | 8/2014 | Timmers et al. | |
| 2016/0227618 | A1 | 8/2016 | Meerbeek et al. | |
| 2021/0003160 | A1 | 1/2021 | Haeussler et al. | |

* cited by examiner

LIGHT EMITTING DEVICE FOR CREATING DYNAMIC NATURAL LIGHTING EFFECTS

CROSS-REFERENCE TO PRIOR APPLICATIONS

This application is the U.S. National Phase application under 35 U.S.C. § 371 of International Application No. PCTEP2022/058143, filed on Mar. 28, 2022, which claims the benefit of European Patent Application No. 21166731.6, filed on Apr. 1, 2021. These applications are hereby incorporated by reference herein.

FIELD OF THE INVENTION

The present invention relates to a light emitting device adapted for creating natural dynamic lighting effects. More particularly, the present invention relates to a light emitting device comprising at least a first light source and a second light source, the first light source and the second light source being adapted for, in operation, emitting light, at least one first lens associated with the first light source, and at least one second lens associated with the second light source.

BACKGROUND OF THE INVENTION

Currently, there is a high interest in bringing the positive aspects of natural light into an office, retail or home environment. Positive aspects of natural light, such as outdoor light or sun light, are e.g. dappled light created by sunlight shining through the leaves of trees or the reflected light from a water surface on the wall of a house. These dynamic light effects can be applied indoors to create a more attractive, lively atmosphere.

A known way to apply dynamic lighting is to project specific content on a wall. The projection of visual content on a wall has been investigated for at least a century. A relatively new way of projection is the use of ultra-short throw (UST) LCD projectors which can be used at a fairly close distance (less than 1 m) to the wall. These projectors give a crisp image on the wall, however at a high cost. Another disadvantage is noise generated by a fan needed to cool the device.

US 2016/227618 A1 describes a lighting system with an array of lighting elements which provide light in different directions. The intensity of the lighting elements is controlled by means of a controller in dependence on a time-varying parameter related to at least one of a position of a light emitting or light reflecting body, and an intensity, color or color temperature of the light emitted or reflected by the body, such that the system can simulate directional sunlight.

It is thus desired to provide a light emitting device with which the above-mentioned disadvantages are reduced or even overcome entirely.

SUMMARY OF THE INVENTION

It is an object of the present invention to provide a light emitting device of the type with which natural dynamic lighting effects may be created, which light emitting device is cheap to produce and which do not produce noise when in operation.

It is a further object of the present invention to provide such a light emitting device which may be used at a fairly close distance to a surface to be illuminated, and which is capable of providing a high quality image on the surface to be illuminated.

According to a first aspect of the invention, these and other objects are achieved by means of a light emitting device comprising at least one cluster of light sources and lenses, the at least one cluster comprising at least a first light source and a second light source, the first light source and the second light source being adapted for, in operation, emitting first respectively second light, at least one first lens associated with the first light source, and at least one second lens associated with the second light source, where the first lens is configured to create a first illuminance pattern in a plane P and the second lens is configured to create a second illuminance pattern in the plane P, where the first light source and the first lens and the second light source and the second lens, respectively, are arranged in a predefined distance D from the plane P, the predefined distance D being measured in a direction extending perpendicular to the plane P, where the first light source and the first lens are arranged such that during operation an average emission direction of the first light is along a first axis, and the second light source and the second lens are arranged such that during operation an average emission direction of the second light is along a second axis, where the first light source and the first lens and the second light source and the second lens, respectively, are oriented such that the first axis and the second axis extend at an angle ϕ with a plane H extending in parallel with and in the predefined distance D from the plane P and that the first axis and the second axis intersect at or in the plane P, wherein the first light source and the first lens and the second light source and the second lens, respectively, are further arranged and on a straight line extending in parallel with the plane P and perpendicular to the direction in which the distance D is measured, wherein the first lens and the second lens are freeform lenses, and wherein the first illuminance pattern and the second illuminance pattern are mutually different illuminance patterns, each illuminance pattern comprising at least three first and at least three second areas, wherein the first areas have a first color and the second areas have a second color different from the first color and/or the first areas comprise a brightest area having a brightness Bb and the second areas are dark areas of a brightness Bd, and wherein Bd<=0.25*Bb, preferably Bd<=0.15*Bb, such as Bd<=0.1*Bb. The plurality of first areas is at least three, but preferably is more than three, such as four, five, ten, or more than twenty. The plurality of second areas is at least three, but preferably is more than three such as four, five, ten, or more than twenty. First and second color are to be understood as also comprising first and second color temperature and correlated color temperature. The average emission direction of a (first and second) light beam is to be understood as the direction towards the center of the whole area, comprising both first and second areas, illuminated by said light beam.

Thereby, and in particular by providing that the first lens is configured to create a first illuminance pattern in a plane P and the second lens is configured to create a second illuminance pattern in the plane P, as well as by providing that the first light source and the first lens and the second light source and the second lens, respectively, are arranged as described above, a light emitting device of the type with which natural dynamic lighting effects of a high quality as perceived by a viewer may be created, which light emitting device is structurally extremely simple and comprises very few components as compared to the prior art solutions. Such a light emitting device is cheap to produce and further does not produce noise when in operation.

The light emitting device could have the feature that the illuminance pattern comprises at least one first area surrounded by a plurality of second areas and at least one second area surrounded by a plurality of first areas. Thus an illuminance pattern with an acceptable, minimal degree of variation in illuminance is created.

Furthermore, and in particular by providing that the first light source and the first lens and the second light source and the second lens, respectively, are arranged in the distance D, and that the first axis and the second axis extend at an angle ϕ, as described above, it is enabled that such a light emitting device may be used at a fairly close distance to a surface to be illuminated, and is still capable of providing a high-quality image on the surface to be illuminated.

In an embodiment, the size of at least one of the first lens and the second lens is chosen in dependence of the size of a light emitting area of at least one of the first light source and the second light source.

Thereby, it becomes possible to scale the size of the optics, particularly the lenses, depending on the size of the light emitting area of the associated light source. This in turn provides for a light emitting device providing a sharper output of a particularly high quality.

In an embodiment, the angle ϕ is an acute angle with the plane H extending in parallel with and in the predefined distance D from the plane P.

Thereby, it is enabled that the light emitting device may be used at a particularly close distance to a surface to be illuminated and that it is still capable of providing a high-quality image on the surface to be illuminated.

In an embodiment, the predefined distance D is equal to or less than one meter.

Thereby, it becomes possible to use the light emitting surface instead of a more complex and expensive projector type, such as ultra-short throw (UST) LCD projectors.

In an embodiment, the first light source and the second light source are configured to, in operation, emitting light of mutually different colors.

Thereby a light emitting device is provided with which a wider range of visual effects may be obtained as compared to if the first light source and the second light source were configured to emit light of the same or similar color.

In an embodiment, the first light source and the second light source are configured to be tunable with respect to any one or more of color, color temperature, light intensity and light flux.

Thereby a light emitting device is provided with which a particularly wide range of visual effects may be obtained. For instance, by tuning color and flux of the first light source and the second light source, visual effects may be obtained where colors appear and disappear in time and the illuminance uniformity can vary between highly non-uniform to almost perfectly uniform. Also, by tuning color and flux as a function of time, visual effects similar to, e.g., a cloudy sky where clouds disappear and appear may be obtained.

In an embodiment, the first light source and the second light source are any one of point light sources, an LED, an LED having a light emitting area with a size of 0.1×0.1 mm, an LED having a light emitting area with a size of 0.15×0.15 mm, a plurality of LEDs, an RGB package of LEDs or an RBGW package of LEDs.

For instance, point light sources are preferred for enabling obtaining a particularly sharp pattern. Also, an LED having a square light emitting area SL with a size of 0.1×0.1 mm is preferred for enabling, for a give lens, obtaining a sharper pattern as compared to, e.g., an LED having a light emitting area with a size of 0.15×0.15 mm, which in turn nevertheless still gives an acceptably sharp pattern. A plurality of LEDs, an RGB package of LEDs or an RBGW package of LEDs are all preferred for enabling patterns composed of several—or indeed all—different colors, and thus enabling complex and highly detailed patterns.

In an embodiment, the mutually different first illuminance pattern and second illuminance pattern comprise randomly generated illuminance patterns and mutually complementary illuminance patterns.

Mutually different illuminance patterns or random illuminance patterns provide for a wide range of visual effects which may change over time. Mutually complementary illuminance patterns are particularly preferred for also enabling a constant illuminance pattern in case both the first and second light source is on. Complementary in this respect means that where a first illuminance pattern has first and second areas, the second illuminance pattern is inversed in color and/or brightness, i.e. the first areas of the first illuminance pattern that have a first color and/or are dark are areas with a second color and/or are bright areas in the second illuminance pattern, and the second areas of the first illuminance pattern that have a second color and/or are bright are areas with a first color and/or are dark areas in the second illuminance pattern.

In an embodiment, the first lens and the second lens are made of any one of optical grade PMMA and polycarbonate.

Thereby, particularly robust and durable lenses are provided for, which in turn provides for a light emitting device providing a continuously high-quality light output over a long period of time.

In an embodiment, at least a part of a light exit surface of at least one of the first lens and the second lens comprises any one of optical microstructures and an optical foil.

Thereby a light emitting device is provided with which the uniformity and smoothness of the light output is enhanced.

In an embodiment, the light emitting device further comprises at least one light mixing element arranged and configured to mix light emitted from at least one of the first light source and the second light source.

Thereby a light emitting device is provided with which the light emitted from one or both of the first light source and the second light source may be mixed in order to provide an improved uniformity of the light output.

In an embodiment, at least a part of a light exit surface of the at least one light mixing element comprises any one of optical microstructures and an optical foil.

Thereby a light emitting device is provided with which the uniformity and smoothness of the mixed light output is enhanced.

In an embodiment, the optical microstructures comprise any one or more of lenslets and surface roughnesses.

Thereby a light emitting device is provided with which an improved uniformity and smoothness of the light output may be obtained in a structurally very simple and easy to manufacture manner.

In an embodiment, the at least one cluster further comprises at least one further light source adapted for, in operation, emitting at least one further light and at least one further lens associated with the at least one further light source, where the first light source and the first lens, the second light source and the second lens and the at least one further light source and the at least one further lens, respectively, are arranged in a predefined distance D from the plane P, the predefined distance D being measured in a direction extending perpendicular to the plane P, wherein the first light source and the first lens are arranged such that during operation the average emission direction of the first light is along the first axis, and the second light source and the second lens are arranged such that during operation the average emission direction of the second light is along the second axis, and the at least one further light source and the at least one further lens are arranged such that during operation the emission direction of at least one further light is along at least one further axis, where the first light source and the first lens, the second light source and the second lens and the at least one further light source and the at least one further lens are oriented such that the first axis, the second axis and the at least one further axis extend at an angle ϕ with a plane H extending in parallel with and in the predefined distance D from the plane P, and that the first axis, the second axis and the at least one further axis intersect at or in the plane P, and where the first light source and the first lens, the second light source and the second lens and the at least one further light source and the at least one further lens, respectively, are further arranged and on a straight line extending in parallel with the plane P and perpendicular to the direction in which the distance D is measured.

Thereby, a light emitting device is provided which has a further degree of freedom in designing the resulting image in the plane P, and which is thus more versatile, especially in terms of use possibilities and complexity of the resulting total image in the plane P.

In an embodiment, each cluster comprises N first lenses, M second lenses and, where provided, Q further lenses, where N, M and Q each are an integer being 1 or more, and where N, M and Q may be the same or different.

Thereby, a light emitting device is provided which has several degrees of freedom in designing the resulting image in the plane P, and which is thus much more versatile, especially in terms of use possibilities.

In an embodiment, the first lenses, the second lenses and, where provided, the further lenses are mutually different lenses.

Thereby, a light emitting device is provided which has a further degree of freedom in designing the resulting image in the plane P, especially as two or more different images may be used to form the resulting total image in the plane P.

In an embodiment, the light emitting device further comprises at least two clusters of light sources and lenses.

In an embodiment, the light emitting device further comprises an array of clusters of light sources and lenses.

Thereby, a light emitting device is provided with which a larger area, such as a whole wall or a broad section of a wall, may be illuminated. Furthermore, such a light emitting device allows for varying the density and illuminance of the pixels forming the resulting image in the plane P with position, for instance such as to obtain a more natural transition between various settings.

In an embodiment, the two or more clusters are arranged with a pitch p seen along the straight line extending in parallel with the plane P and perpendicular to the direction in which the distance D is measured, where the pitch p is chosen to be smaller than the size in the direction of the said straight line of the areas illuminated by the respective cluster of the two or more clusters.

Thereby a seamless transition between the areas illuminated by the respective cluster of the two or more clusters is obtained.

The invention further relates to a luminaire or a lamp comprising a housing at least partly accommodating a light emitting device according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

Figure 1:
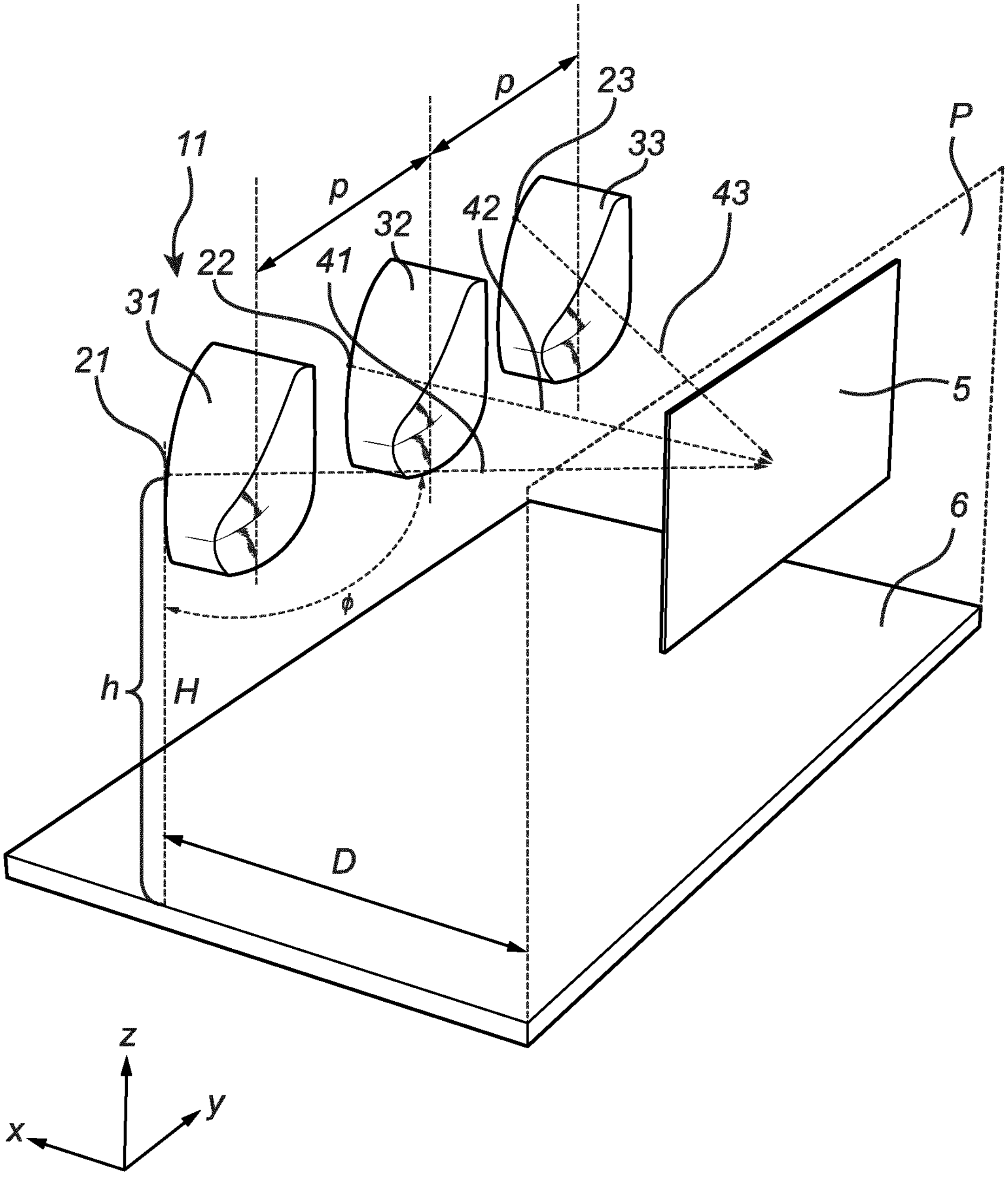
FIG. 1 shows a perspective view of a first embodiment of a light emitting device according to the invention and comprising a first light source and a first lens, a second light source and a second lens and a third light source and a third lens.

As illustrated in the figures, the sizes of layers and regions are exaggerated for illustrative purposes and, thus, are provided to illustrate the general structures of embodiments of the present invention. This especially applies for the size of the lenses 31-33 and 311, 312, 321, 322, 331, 332, respectively, with respect to the size of the image 5 and 51-53, respectively, in the illustrations of FIGS. 1 and 2. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1 shows a perspective view of a first embodiment of a light emitting device 1 according to the invention. Generally, the light emitting device 1 according to the invention comprises a first light source 21 and a first lens 31 as well as a second light source 22 and a second lens 32. This applies for all embodiments of the invention.

The first light source 21 and the first lens 31 are arranged on a first axis 41. The second light source 22 and the second lens 32 are arranged on a second axis 42. The first axis 41 and the second axis 42 intersect at a target surface 5. The target surface 5 is a surface which it is desired to illuminate with the light emitting device 1. The target surface 5 may for instance be a wall (as shown on FIG. 1), a ceiling or a floor.

The first light source 21 and the second light source 22 are arranged in a distance D from a plane P in which the target surface 5 is arranged. The distance D is measured perpendicular to the plane P, i.e. in the direction x illustrated by the coordinate system shown in FIG. 1. The distance D is thus the shortest distance between the respective light source 21, 22 and the plane P. The distance D is generally less than one meter. The first light source 21 and the first lens 31 and the second light source 22 and the second lens 32 are further arranged in a height h above a surface 6 extending perpendicular to the plane P. The height h is measured in the direction z illustrated by the coordinate system shown in FIG. 1. For instance, in case the target surface 5 is a wall, the surface 6 may be a floor surface. The first axis 41 and the second axis 42 extend at an angle $\phi$ with a plane H extending in parallel with and in the predefined distance D from the plane P. The angle $\phi$ may be an acute angle with the plane H. The first axis 41 and the second axis 42 further intersect at or in the plane P.

The first light source 21 and the first lens 31 and the second light source 22 and the second lens 32 are further arranged on a straight line extending in the direction y illustrated by the coordinate system shown in FIG. 1, and thus in parallel with the plane P and the target surface 5. The first light source 21 and the first lens 31 and the second light source 22 and the second lens 32, respectively, are more particularly arranged beside one another in the direction y. The distance or free space in the direction y between the first lens 31 and the second lens 32 is generally less than 25 mm, such as between 5 and 25 mm. The diameter of the first lens 31 and the second lens 32 may be between 10 mm and 50 mm.

The first light source 21 and the second light source 22 may be point light sources, or light sources having a light emitting area with, e.g., a size of 0.1×0.1 mm or 0.15×0.15 mm. The first light source 21 and the second light source 22 may be an LED or a plurality of LEDs, such as an RGB or an RBGW package of LEDs. The first light source 21 and the second light source 22 may be adapted for, in operation, emitting first light respectively second light, said first and second light being of mutually different colors.

Figure 4A:
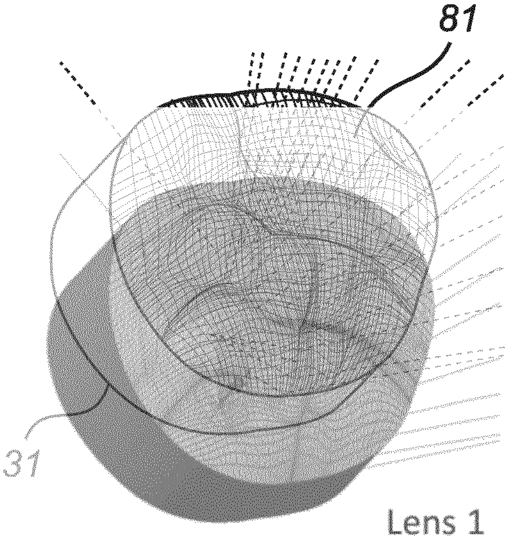
FIG. 4A shows a perspective view of an exemplary first lens of a light emitting device according to the invention.
Figure 4B:
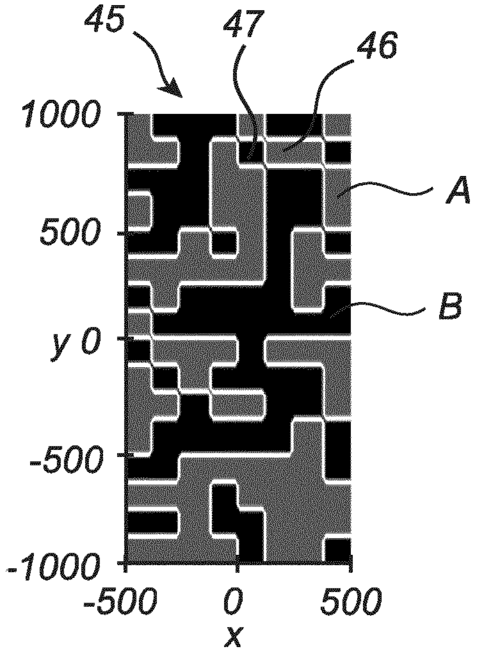
FIG. 4B shows a plot illustrating the illuminance pattern created by the first lens of FIG. 4A on a target surface.
Figure 5A:
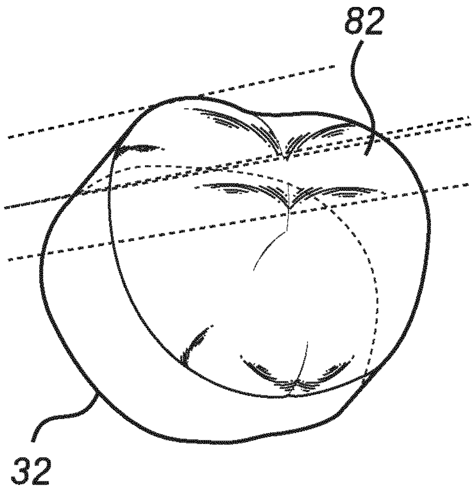
FIG. 5A shows a perspective view of an exemplary second lens of a light emitting device according to the invention.
Figure 5B:
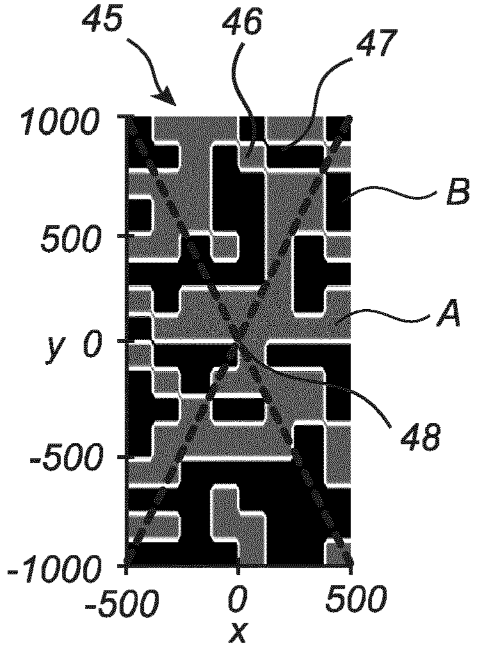
FIG. 5B shows a plot illustrating the illuminance pattern created by the second lens of FIG. 5A on a target surface.

The light emitting device 1 comprising at least the combination of the first light source 21 with the first lens 31 for providing first light and the combination of the second light source 22 with the second lens 32 for providing second light, said combinations together may be configured to provide any suitable or desired dynamic pattern on the target surface 5, including a random pattern. The size of the first lens 31 and the second lens 32 may be chosen in dependence of the size of a light emitting area of at least one of the first light source 21 and the second light source 22. The first lens 31 and the second lens 32 may be made of optical grade PMMA or polycarbonate or another suitable material. An example of a first lens 31 and a second lens 32 are shown in more detail in FIGS. 4A and 5A, respectively. In this embodiment, the first lens 31 and the second lens 32 are freeform lenses and are configured to provide mutually complementary illumination patterns on the target surface 5. Such complementary illumination patterns are illustrated in FIGS. 4B and 5B, illustrating an exemplary illumination pattern of the respective lenses 31, 32 of FIGS. 4A and 4B. As may be seen, the lens 31 provides an illumination pattern (FIG. 4B) having some parts/areas with a first color and/or brightness A and some parts/areas with a second color and/or brightness B, while the lens 32 provides an identical illumination pattern (FIG. 5B), albeit where the parts having the color and/or brightness A in FIG. 4B have the color and/or brightness B and vice versa in FIG. 5B. Alternatively, the first lens 31 and the second lens 32 may be configured to provide mutually different or even random illumination patterns. In the FIGS. 4B and 5B the brightness of bright areas is about six times higher than the brightness of dark areas. Also shown in FIGS. 4B and 5B is that the illuminance pattern covers a whole illuminated area 45 and comprises a plurality of over ten of first areas 46 and a plurality of over ten of second areas 47. Furthermore, there is at least one first area 46 surrounded by at least three second areas 47 and there is at least one second area 47 surrounded by at least three first areas 46. In FIG. 5B the center 48 of the whole rectangular illuminated area 45 is indicated, i.e. in this case being the intersection of the two diagonals of the rectangular illuminated area 45. Said center 48 indicates the average emission direction of a light source.

The first lens 31 and the second lens 32 comprises a light exit surface. A part or all of the light exit surface of the first lens 31 and the second lens 32 may comprise an optical element 81, 82 (cf. FIG. 2) such as optical microstructures, e.g. lenslets, surface roughnesses or the like, or an optical foil.

The light emitting device 1 also comprises a further (third) light source 23 adapted for, in operation, emitting light and a further (third) lens 33 associated with the further light source 23. It is noted that the further light source 23 and the further lens 33 are optional features. More than one further light source and associated lens may in principle also be provided. The further light source 23 and the further lens 33 may be of any of the respective types of light sources and lenses described above. The further light source 23 may be of a type emitting light of a color differing from both the first light source 21 and the second light source 22 or being the same as one of the first light source 21 and the second light source 22. The further lens 33 may be different from, both the first lens 31 and the second lens 32.

The further light source 23 and the further lens 33 are arranged on a further axis 43. The further light source 23 and the further lens 33 are oriented such that the further axis 43 intersects the first axis 41 and the second axis 42 at the target surface 5. The further light source 23 and the further lens 33 are arranged in a distance D from the plane P and thus from the target surface 5. The distance D is generally equal to or less than 1 meter. The further light source 23 and the further lens 33 are further arranged in a height h, for instance a height h above a floor surface 6. The height h is typically equal to or less than 2.5 m. The further axis 43 extends at an angle ϕ, such as an acute angle ϕ, with respect to the plane H. The further light source 23 and the further lens 33 are arranged beside the first light source 21 and the first lens 31 and the second light source 22 and the second lens 32, respectively, in the direction y extending in parallel with the plane P and thus with target surface 5. The distance or free space in the direction y between the further lens 33 and the first lens 31 and the second lens 32, respectively, is generally less than 25 mm, such as between 5 and 25 mm. The diameter of the further lens 33 may be between 10 mm and 50 mm.

Figure 2:
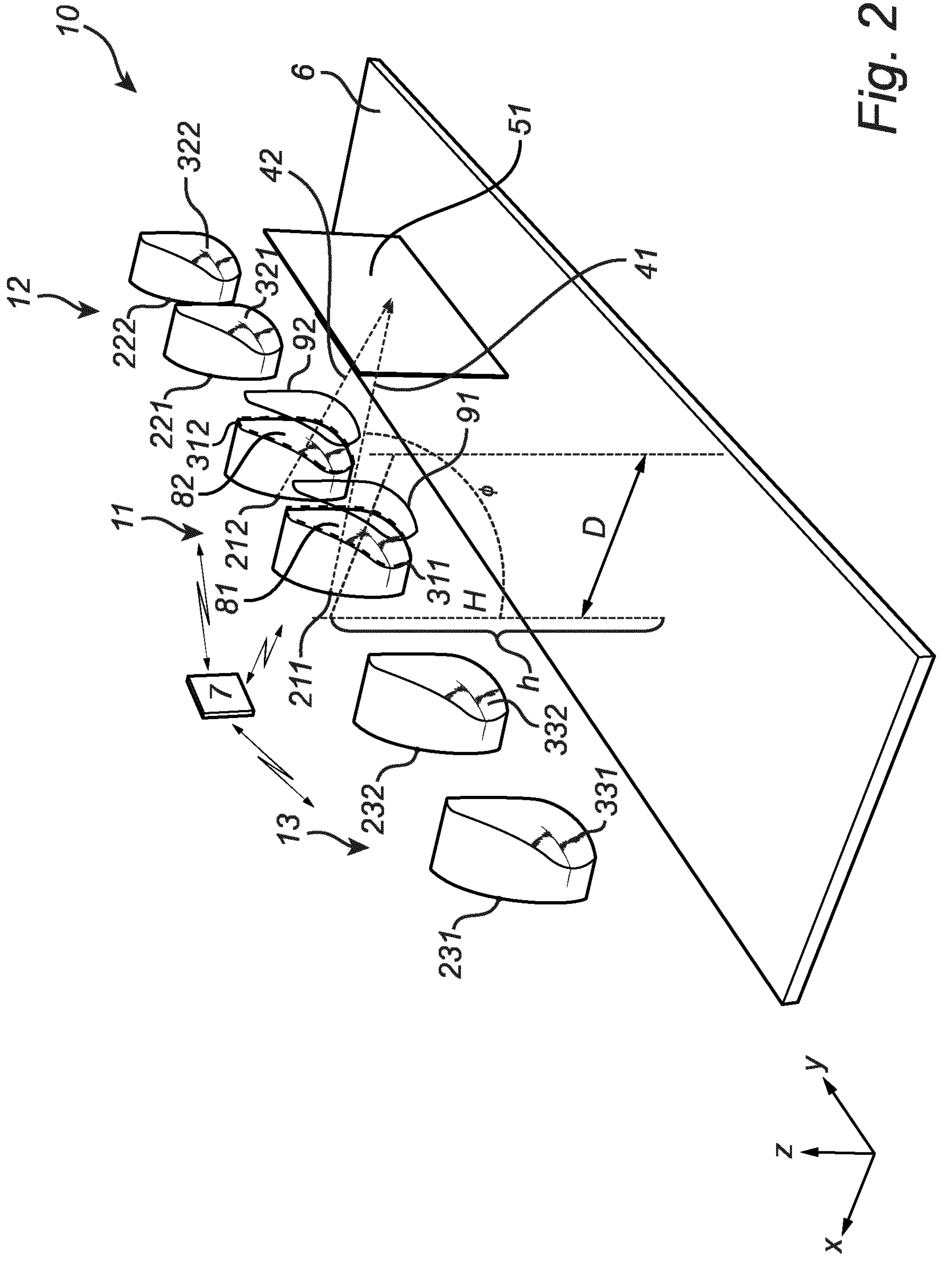
FIG. 2 shows a perspective view of a second embodiment of a light emitting device according to the invention and comprising three clusters of lenses, each cluster comprising a first light source and a first lens and a second light source and a second lens.

Turning now to FIG. 2, a perspective view of a second embodiment of a light emitting device 10 according to the invention is shown. The light emitting device 10 differs from that described above in relation to FIG. 1 in virtue of the following features.

The light emitting device 10 comprises three clusters 11, 12, 13 of lenses. Each cluster 11, 12, and 13 comprises two light sources and two lenses. The first cluster 11 comprises a first light source 211 and a first lens 311 as well as and a second light source 212 and a second lens 312. The second cluster 12 comprises a first light source 221 and a first lens 321 as well as and a second light source 222 and a second lens 332. The third cluster 11 comprises a first light source 231 and a first lens 331 as well as and a second light source 232 and a second lens 332. In comparison, the light emitting device 1 according to FIG. 1 thus comprises only one cluster 11.

Generally, each cluster 11, 12, 13 is in principle identical. Generally speaking, each cluster comprises N first lenses, being lenses of a first type, and M second lenses, being lenses of a second type, where N is an integer being 1 or more and where M is an integer being 1 or more, and where N and M may be the same or different. Optionally, each cluster may further comprise Q further lenses, e.g. being lenses of a further type different from the first and second type, where Q is an integer being 1 or more, and where Q may be the same as or different from one or both of N and M.

The light emitting device 10 comprises a light mixing element 91 arranged and configured to mix light emitted from the first light source 211 of the first cluster 11 and a light mixing element 92 arranged and configured to mix light emitted from the second light source 222 of the first cluster. The light mixing elements 91, 92 may be arranged between the respective light source 211, 212 and lens 311, 312 or (as shown on FIG. 2) in front of the respective lens 311, 312. The light mixing elements 91, 92 each comprise a light exit surface. A part of or all of the light exit surface one or both light mixing elements 91, 92 may comprise optical microstructures, e.g. lenslets, surface roughnesses or the like, or an optical foil. Similar light mixing elements may be provided to the second cluster 12 and/or to the third cluster 13.

The first light sources 211, 221 and 231 and the second light sources 212, 222 and 232 of each of the three clusters 11, 12 and 13 are in this embodiment configured to be tunable with respect to color, color temperature, light intensity, light flux or any combination thereof. The light emitting device 10 comprises a controller 7 configured to control the tunable parameter or parameters of the light sources 211, 221, 231, 212, 222 and 232. The controller 7 is thus in a signal transferring relationship with the respective light sources 211, 221, 231, 212, 222 and 232, for instance by use of a wired or wireless connection.

It is also feasible to provide a light emitting device according to the invention with more than three clusters. It is also feasible to provide at least one cluster of a light emitting device according to the invention with more than pairs, such as four, five or six pairs, of light sources and lenses.

A light emitting device according to the invention may also comprise an array of clusters such as the clusters 11, 12, 13 shown in FIG. 2. The light emitting device 10 thus comprises an array of 1×3 clusters. By way of example, a second row of three clusters similar to the clusters shown in FIG. 2 may be provided at another position in the Z-direction such as to provide an array of 2×3 clusters. In principle any suitable size of array is possible.

Figure 3:
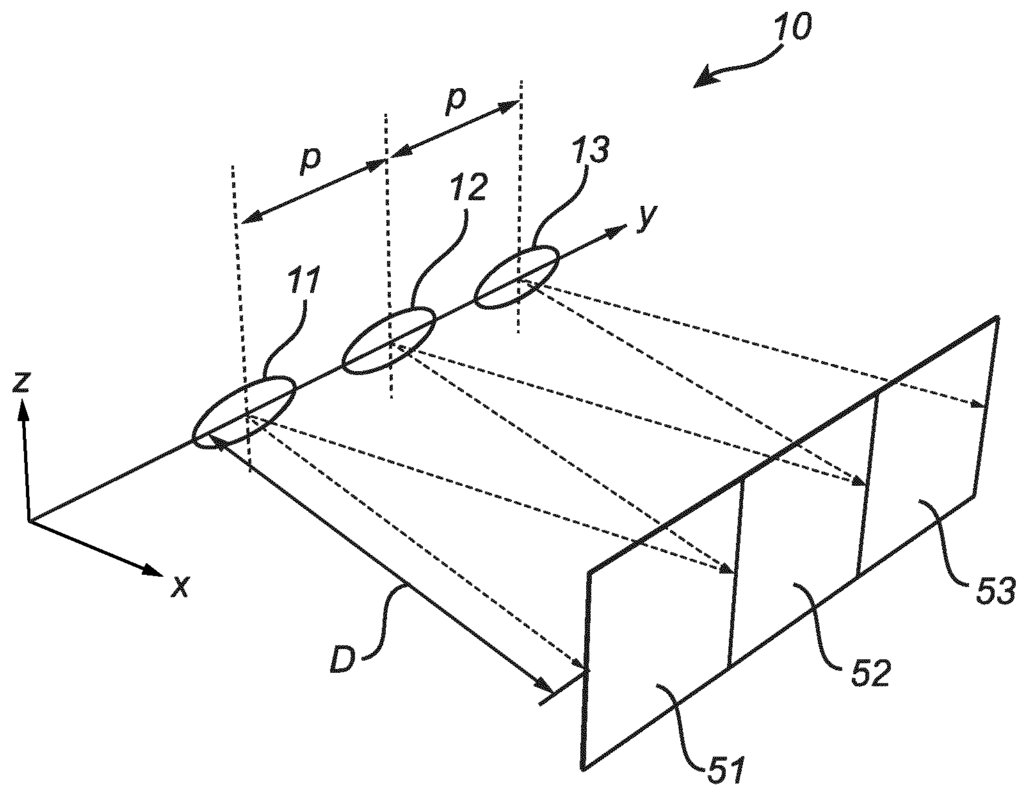
FIG. 3 shows a perspective and simplified view of the light emitting device according to FIG. 2 seen from another angle of view making all illuminated areas visible.

Turning now to FIG. 3, a perspective view of the light emitting device 10 according to FIG. 2 and seen from another angle of view making all illuminated areas visible is shown. For the sake of simplicity, the lenses and light sources of each cluster are not shown explicitly on FIG. 3. As may be seen, the first cluster 11 illuminates a first target area 51, the second cluster 12 illuminates a second target area 52 and the third cluster 13 illuminates a third target area 53. The first and second target areas 51 and 52 are arranged with an overlap, and the second and third target areas 52 and 53 are arranged with an overlap. Thereby a seamless transition between the target areas is obtained. To obtain this, the clusters 11, 12, 13 are arranged with a pitch p seen along the direction y, where the pitch p is smaller than the size of the illuminated areas 51, 52, 53 measured in the direction y.

Simulation Examples

In the following a number of examples of simulations performed on a light emitting device 1 according to the invention and as described above with reference to FIG. 1 will be described. The examples are described with reference to FIGS. 6-12 and serve to illustrate the function of and effects obtained with a such light emitting device 1.

Figure 6:
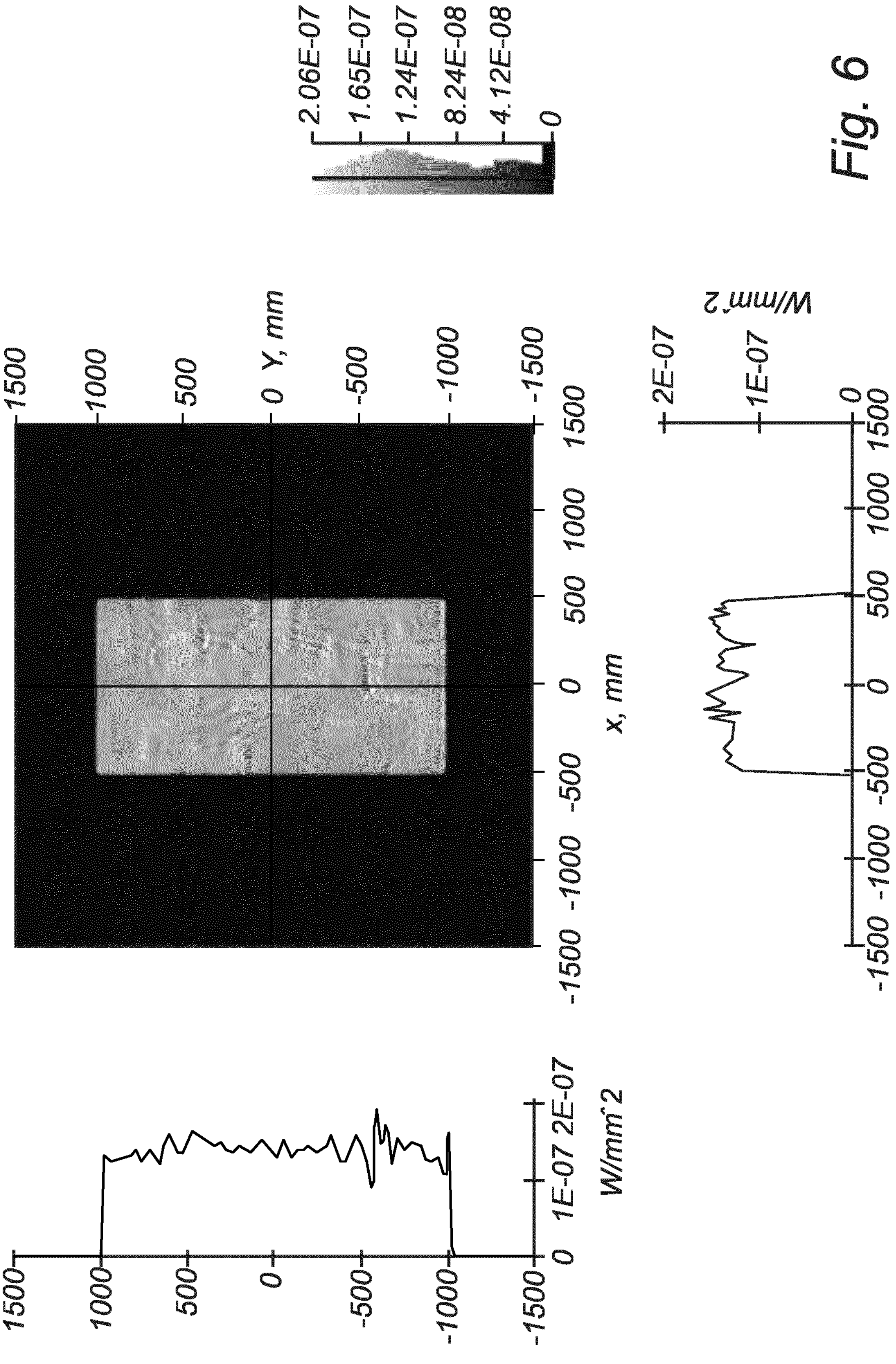
FIG. 6 shows plots illustrating the irradiance created on a target surface by using a light emitting device according to FIG. 1 and comprising a first light source and a first lens and a second light source and a second lens, the first and second light sources being point light sources.
Figure 7:
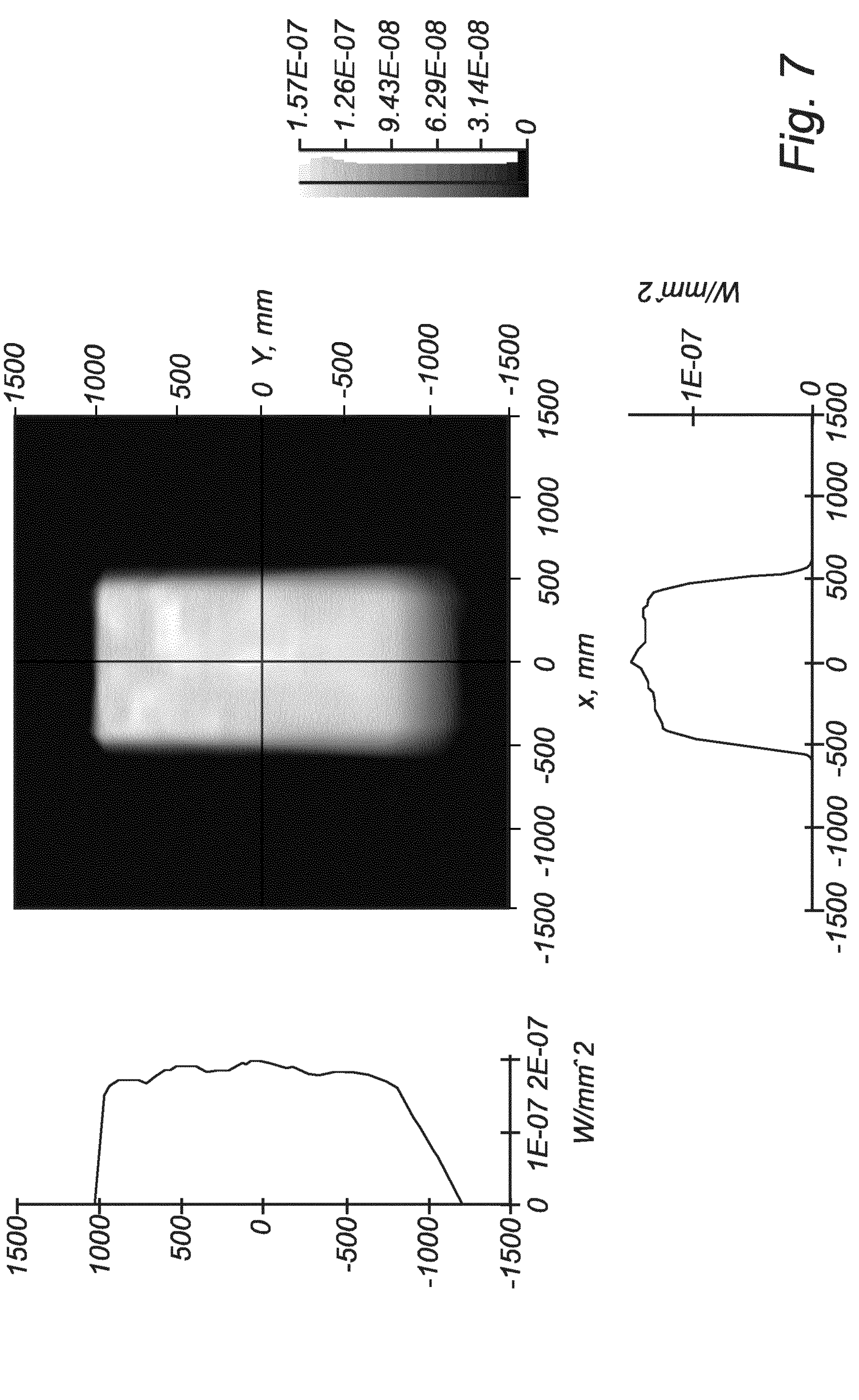
FIG. 7 shows plots illustrating the irradiance created on a target surface by using a light emitting device according to FIG. 1 and comprising a first light source and a first lens and a second light source and a second lens, the first and second light sources having a light emitting surface area of 0.1×0.1 mm.

FIG. 6 shows plots illustrating the irradiance created on a target surface 5 by using a light emitting device 1 according to FIG. 1, where the optional third light source and lens are omitted, and where the first light source 21 and the second light source 22 are provided as point light sources. FIG. 7 shows plots similar to those of FIG. 6 and illustrating the irradiance created on a target surface 5 by using a light emitting device 1 according to FIG. 1, where the first light source 21 and the second light source 22 are provided with a light emitting surface area of 0.1×0.1 mm. The first lens 31 and the second lens 32 used in these two examples were identical.

As may clearly be seen, for a given lens 31, 32, the use of light sources 21 and 22 with a light emitting surface area of 0.1×0.1 mm provides a more uniform image with a higher irradiance level as compared to the use of point light sources 21 and 22. On the other hand, the use of point light sources 21 and 22 provides a considerably sharper image with a higher quality as compared to the use of light sources 21 and 22 with a light emitting surface area of 0.1×0.1 mm.

Figure 8:
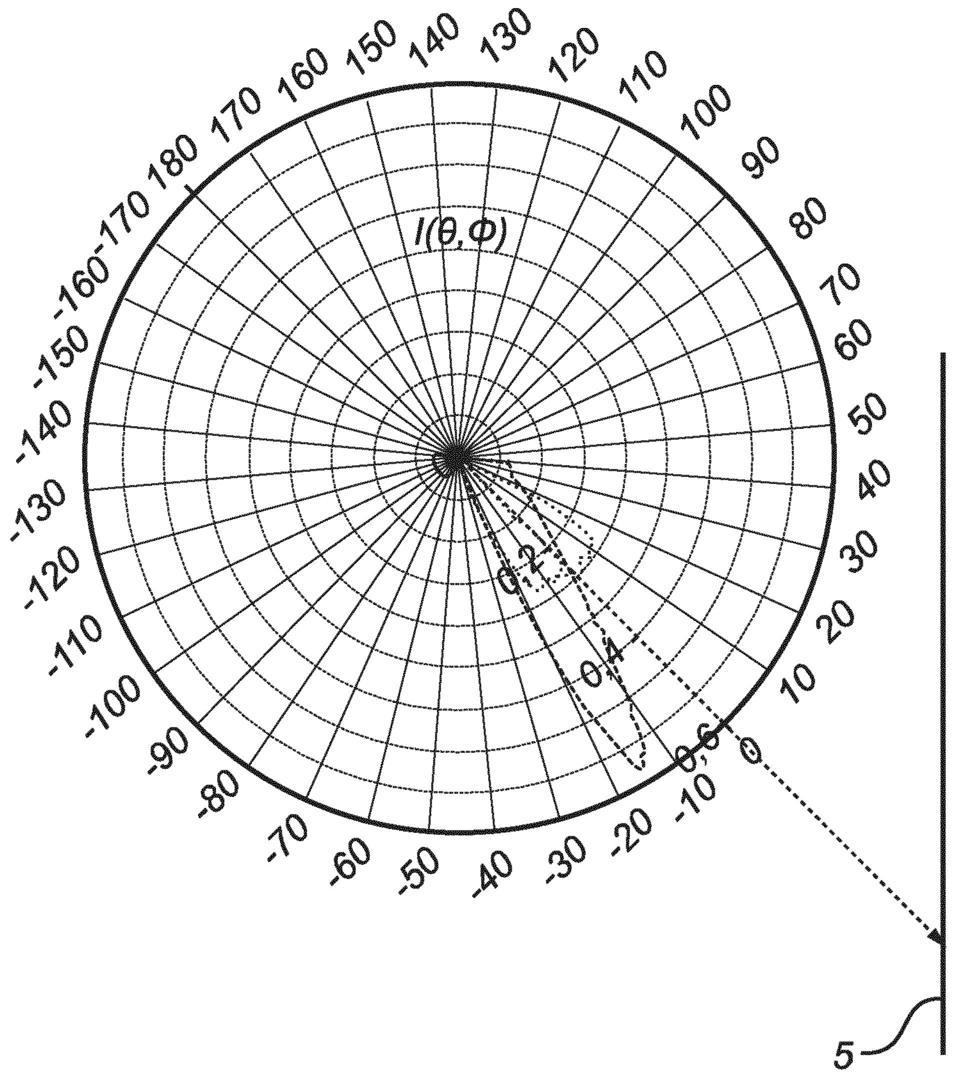
FIG. 8 shows a circular plot illustrating the direction of the irradiance created by using a light emitting device according to FIG. 1 and comprising a first light source and a first lens and a second light source and a second lens, the first and second light sources having a light emitting surface area of 0.1×0.1 mm.
Figure 9:
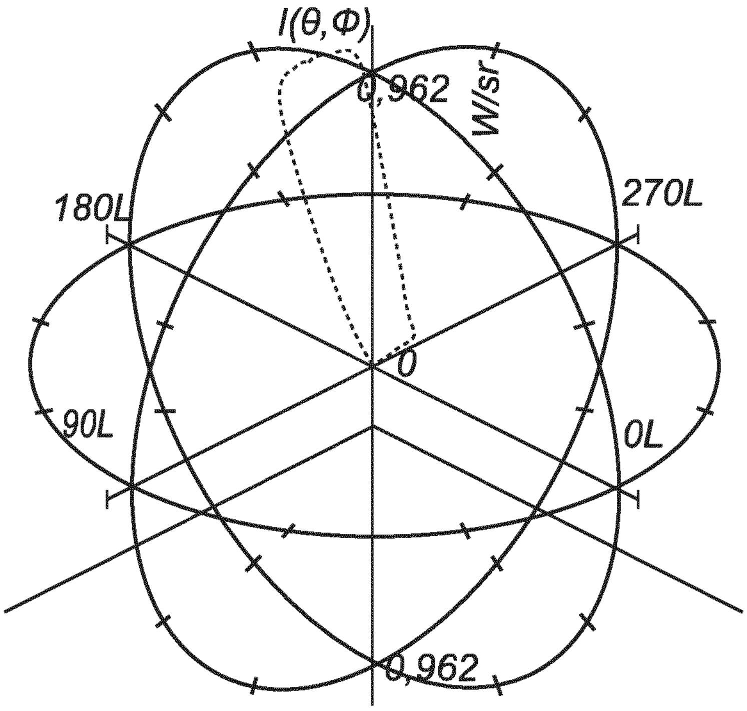
FIG. 9 shows a spherical plot illustrating the spatial direction of the irradiance created by using a light emitting device according to FIG. 1 and comprising a first light source and a first lens and a second light source and a second lens, the first and second light sources having a light emitting surface area of 0.1×0.1 mm.

FIG. 8 shows a circular plot illustrating the direction of the irradiance created by using a light emitting device 1 according to FIG. 1, where the optional third light source and lens are omitted, and where the first light source 21 and the second light source 22 are provided with a light emitting surface area of 0.1×0.1 mm. FIG. 9 shows a spherical plot illustrating the spatial direction of the irradiance created by using the same light emitting device as used to produce the result illustrated in FIG. 8.

As may clearly be seen, for a given lens 31, 32, the use of light sources 21 and 22 with a light emitting surface area of 0.1×0.1 mm provides an output with a very well defined directionality, and thus provides for a particularly sharp pattern and thus resulting image on the target area 5.

Figure 10:
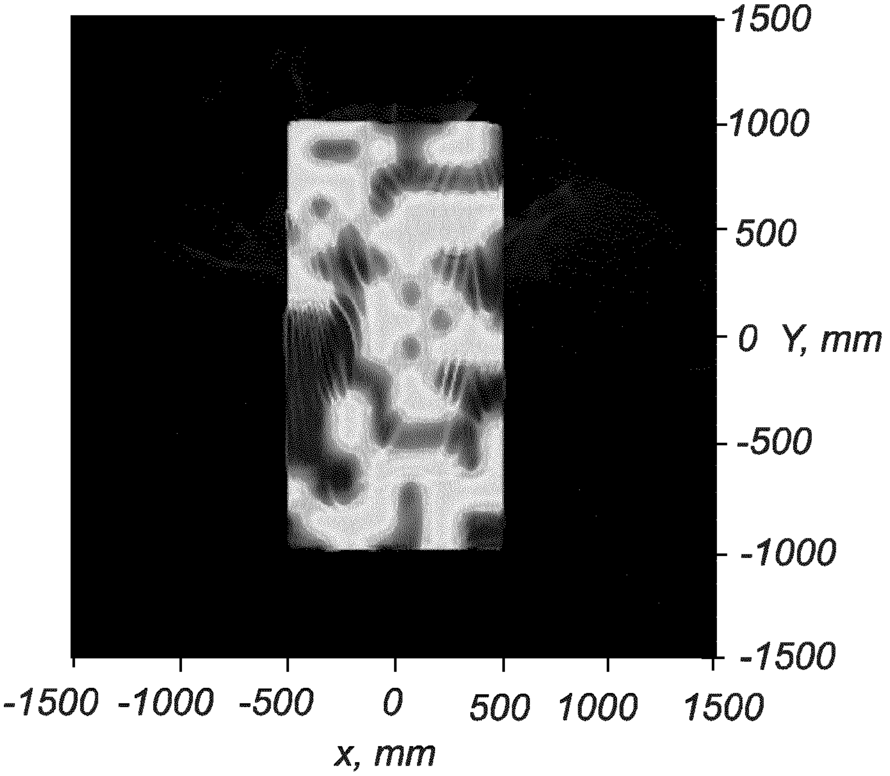
FIG. 10 shows a plot illustrating the irradiance created on a target surface by using a light emitting device according to FIG. 1 and comprising a first light source and a first lens and a second light source and a second lens, the first and second light sources being point light sources, where the lighter the gray tone, the higher the irradiance.
Figure 11:
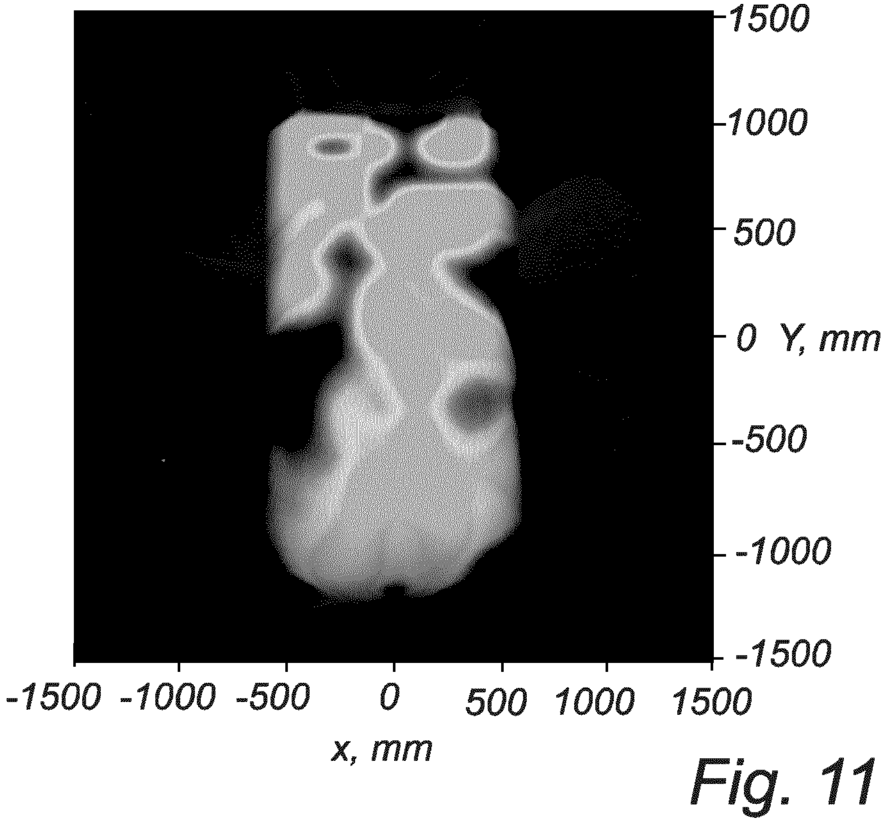
FIG. 11 shows a plot illustrating the irradiance created on a target surface by using a light emitting device according to FIG. 1 and comprising a first light source and a first lens and a second light source and a second lens, the first and second light sources having a light emitting surface area of 0.1×0.1 mm, where the lighter the gray tone, the higher the irradiance.
Figure 12:
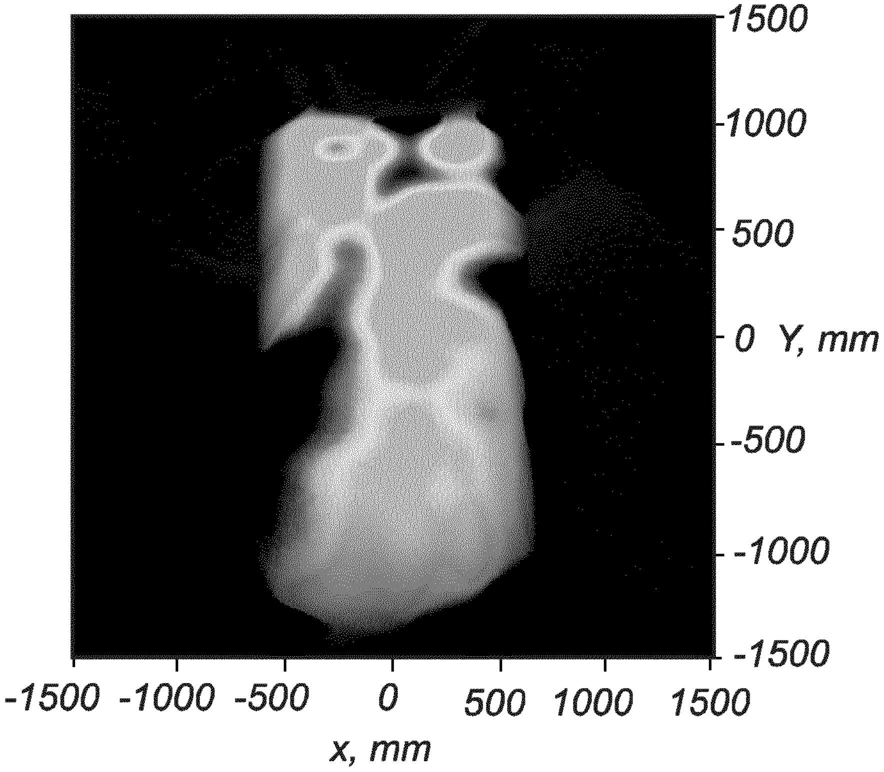
FIG. 12 shows a plot illustrating the irradiance created on a target surface by using a light emitting device according to FIG. 1 and comprising a first light source and a first lens and a second light source and a second lens, the first and second light sources having a light emitting surface area of 0.15×0.15 mm, where the lighter the gray tone, the higher the irradiance.

FIG. 10 shows a plot illustrating the irradiance created on a target surface 5 by using a light emitting device 1 according to FIG. 1, where the optional third light source and lens are omitted, and where the first light source 21 and the second light source 22 are point light sources. FIG. 11 shows a plot similar to that of FIG. 10 and illustrating the irradiance created on a target surface 5 by using a light emitting device 1 according to FIG. 1, where the optional third light source and lens are omitted, and where the first light source 21 and the second light source 22 have a light emitting surface area of 0.1×0.1 mm. Finally, FIG. 12 shows a plot illustrating the irradiance created on a target surface 5 by using a light emitting device 1 according to FIG. 1, where the optional third light source and lens are omitted, and where the first light source 21 and the second light source 22 have a light emitting surface area of 0.15×0.15 mm. In all three cases identical lenses 31 and 32 were used. For all three plots (FIG. 10-12) it applies that the lighter the gray tone on the plot, the higher the irradiance.

As may clearly be seen from FIGS. 10-12, for a given lens 31, 32, the use of light sources 21 and 22 with a light emitting surface area of 0.1×0.1 mm provides a more uniform image with a higher irradiance level as compared to the use of point light sources. On the other hand, the use of point light sources 21 and 22 provides a considerably sharper image with a higher quality as compared to the use of light sources 21 and 22 with a light emitting surface area of 0.1×0.1 mm. Likewise, the use of light sources 21 and 22 with a light emitting surface area of 0.1×0.1 mm provides a considerably sharper image with a higher quality as compared to the use of light sources 21 and 22 with a light emitting surface area of 0.15×0.15 mm. However, the use of light sources 21 and 22 with a light emitting surface area of 0.15×0.15 mm is seen to still yield a sharp image with a high quality.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising at least one cluster of light sources and lenses, the at least one cluster comprising:

at least a first light source and a second light source, the first light source and the second light source being adapted for, in operation, emitting first respectively second light, at least one first lens associated with the first light source, and at least one second lens associated with the second light source, wherein the first lens is configured to create a first illuminance pattern in a plane P and the second lens is configured to create a second illuminance pattern in the plane P, wherein the first light source and the first lens and the second light source and the second lens, respectively, are arranged in a predefined distance D from the plane P, the predefined distance D being measured in a direction extending perpendicular to the plane P, wherein the first light source and the first lens are arranged such that during operation an average emission direction of the first light is along a first axis, and the second light source and the second lens are arranged such that during operation an average emission direction of the second light is along a second axis, wherein the first light source and the first lens and the second light source and the second lens, respectively, are oriented such that the first axis and the optical axis extend at an angle φ with a plane H extending in parallel with and in the predefined distance D from the plane P and that the first axis and the second axis intersect at or in the plane P, wherein the first light source and the first lens and the second light source and the second lens, respectively, are further arranged and on a straight line extending in parallel with the plane P and perpendicular to the direction in which the distance D is measured, wherein the first lens and the second lens are freeform lenses, and wherein the first illuminance pattern and the second illuminance pattern are mutually different illuminance patterns, each illuminance pattern comprising at least three first areas and at least three second areas, wherein the first areas have a first color and the second areas have a second color different from the first color and/or the first areas comprise a brightest area having a brightness Bb and the second areas are dark areas of a brightness Bd, and wherein Bd<=0.25*Bb, preferably Bd<=0.15*Bb, such as Bd<=0.1*Bb.

2. A light emitting device according to claim 1, wherein the illuminance pattern comprises at least one first area surrounded by a plurality of second areas and at least one second area surrounded by a plurality of first areas.

3. A light emitting device according to claim 1, wherein the angle φ is an acute angle with the plane H extending in parallel with and in the predefined distance D from the plane P.

4. A light emitting device according to claim 1, wherein the first light source and the second light source are any one or more of:

configured to, in operation, emitting light of mutually different colors, configured to be tunable with respect to any one or more of color, color temperature, light intensity and light flux, and point light sources, an LED, an LED having a square light emitting area SL with a size in the range of 0.1×0.1 mm<=SL<=0.15×0.15 mm, a plurality of LEDs, an RGB package of LEDs or an RBGW package of LEDs.

5. A light emitting device according to claim 1, wherein the mutually different first illuminance pattern and second illuminance pattern comprise randomly generated illuminance patterns and mutually complementary illuminance patterns.

6. A light emitting device according to claim 1, wherein the predefined distance D is equal to or less than one meter.

7. A light emitting device according to claim 1, wherein at least a part of a light exit surface of at least one of the first lens and the second lens comprises any one of optical microstructures and an optical foil.

8. A light emitting device according to claim 7, wherein the optical microstructures or the optical foil comprises any one or more of lenslets and surface roughnesses.

9. A light emitting device according to claim 1, and further comprising at least one light mixing element arranged and configured to mix light emitted from at least one of the first light source and the second light source.

10. A light emitting device according to claim 9, wherein at least a part of a light exit surface of the at least one light mixing element comprises any one of optical microstructures and an optical foil.

11. A light emitting device according to claim 1, wherein the at least one cluster further comprises:

at least one further light source adapted for, in operation, emitting at least one further light and at least one further lens associated with the at least one further light source, wherein the first light source and the first lens, the second light source and the second lens and the at least one further light source and the at least one further lens, respectively, are arranged in a predefined distance D from the plane P, the predefined distance D being measured in a direction extending perpendicular to the plane P, wherein the first light source and the first lens are arranged such that during operation the average emission direction of the first light is along the first axis, and the second light source and the second lens are arranged such that during operation the average emission direction of the second light is along the second axis, and the at least one further light source and the at least one further lens are arranged such that during operation the emission direction of at least one further light is along at least one further axis, wherein the first light source and the first lens, the second light source and the second lens and the at least one further light source and the at least one further lens are oriented such that the first axis, the second axis and the at least one further axis extend at an angle φ with a plane H extending in parallel with and in the predefined distance D from the plane P, and that the first axis, the second axis and the at least one further axis intersect at or in the plane P, and wherein the first light source and the first lens, the second light source and the second lens and the at least one further light source and the at least one further lens, respectively, are further arranged and on a straight line extending in parallel with the plane P and perpendicular to the direction in which the distance D is measured.

12. A light emitting device according to claim 1, wherein the at least one cluster comprises N first lenses, M second lenses and, where provided, Q further lenses, where N, M and Q each are an integer being 1 or more, and where N, M and Q may be the same or different.

13. A light emitting device according to claim 1, wherein the at least one first lens, the at least one second lens and, where provided, the at least one further lens are mutually different lenses.

14. A light emitting device according to claim 1, and further comprising at least two clusters of light sources and lenses, or further comprising an array of clusters of light sources and lenses.

15. A luminaire comprising a housing at least partly accommodating a light emitting device according to claim 1.

* * * * *